Feb. 20, 1934.  C. H. VOGT  1,947,506
METHOD FOR TREATING SAUSAGES
Filed May 7, 1928
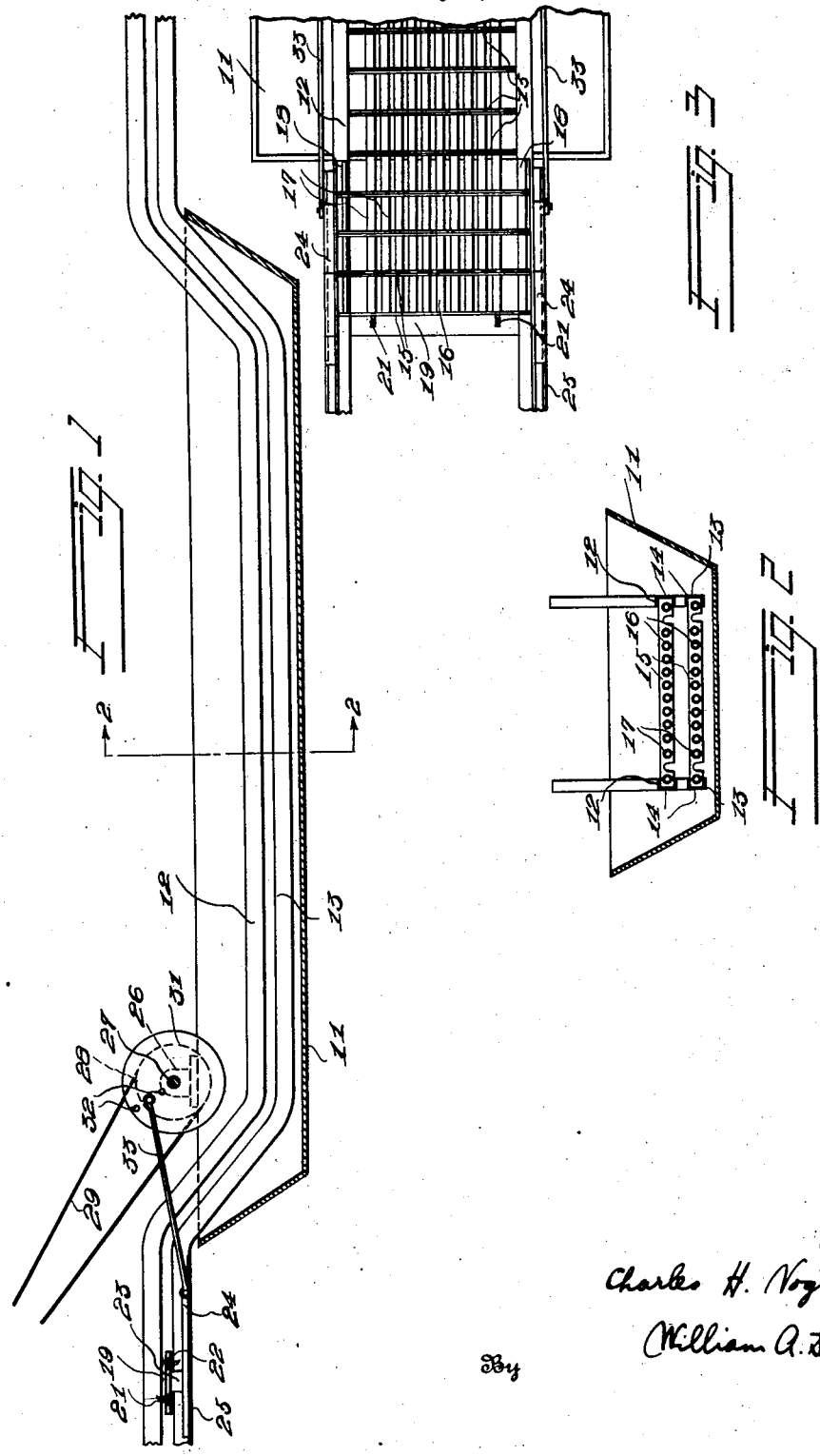
Inventor
Charles H. Vogt.
William A. Strauch
By
Attorney Patented Feb. 20, 1934

1,947,506

UNITED STATES PATENT OFFICE 1,947,506

METHOD FOR TREATING SAUSAGES

Charles H. Vogt, Philadelphia, Pa.

Application May 7, 1928. Serial No. 275,778

9 Claims. (Cl. 99—11)

The present invention relates to a novel method and apparatus for the treatment of casingless sausage.

More specifically, the invention relates to a method and apparatus for the treatment of casingless sausage in molds, the sausage meat having previously been forced into the molds in accordance with the method and apparatus disclosed in my copending applications 172,612 and 255,941, filed March 4, 1927 and February 21, 1928, respectively, and prior to the extraction of the sausages from the molds in accordance with the method and apparatus disclosed in my copending application, 255,942, filed February 21, 1928.

It is essential that the sausages within the molds be subjected to proper temperatures to cause the sausage meat to solidify to the proper degree whereby they may be extracted from the molds in accordance with the method and apparatus disclosed in said copending application, 255,942, without destroying the desired attractive shape of the sausages or breaking the outside coatings thereof.

As disclosed in my copending applications, the molds containing the sausages were subjected to freezing temperatures in order to solidify the meat to the proper extent by placing the molds in rooms maintained at low temperatures for relatively long periods of time. This practice made it necessary that long periods of time elapse between the beginning and the completion of the manufacture of casingless sausage, this necessitating the use of a large number of molds, that are relatively expensive, because of the fact that a very large number of the molds had to be kept in the refrigerating room for many hours, and were not available for use.

I now have found that the time to manufacture the sausages may be greatly reduced by passing the molds through a brine solution that is maintained at a temperature of preferably from 0° to 7° Fahrenheit, the brine tank being of a sufficient length so that as the molds move therethrough either in a straight or tortuous path depending upon the size of the tank the temperature of the meat contained therein will be reduced sufficiently to cause the formation of a smooth outer coating upon the body of the sausage, and to set the sausage so that it may be subsequently ejected from the mold without breaking the smooth outer surface and without changing the external shape thereof. Moreover, inasmuch as by moving the molds through the brine tank the refrigeration of the sausage contained in the molds may be completed in a period of seven minutes, it will be apparent that the sausages may be made in large quantities without using a very great number of molds, since the completed sausages may be ejected from the molds in use after a relatively short period of time and the same molds may be again put to use. At the same time this method of treatment produces a superior sausage.

It has been found further that if the sausages within the molds are subjected to a relatively rapid refrigeration effect to bring them to a low temperature that it is necessary to eject them from the molds by exerting comparatively heavy pressures thereon to permit the temperature of the molds to rise slightly after they are removed from the brine solution in order that the best results may be secured in subsequently removing the sausages from the molds without disruption of the outer surface thereof. It is only necessary, however, that the molds containing the sausages be permitted to remain in ordinary room temperatures for a period of time of no more than three to ten minutes before the sausages may be safely removed from the molds without damage.

It is accordingly a primary object of the present invention to provide a method and apparatus for the treatment of sausages in molds whereby the sausages may be successfully extracted from the molds after a lapse of only a short period of time without injury thereto.

It is a still further object of the present invention to provide a method and apparatus for the treatment of casingless sausages in molds for expeditiously properly conditioning the sausages for effective extraction therefrom.

It is a still further object of the present invention to provide a method for the treatment of casingless sausages in molds which is capable of being carried out by means of simple and inexpensive apparatus that will permit re-use of the molds after relatively short intervals.

With the foregoing objects in view as well as others that may appear from the following disclosure, reference will be had to the accompanying drawing forming a part thereof and which exemplify a preferred embodiment of apparatus for successfully carrying the method into effect.

In the drawing:—

Figure 1 is a side elevational view, partly in longitudinal section of a preferred form of apparatus for carrying my method into effect.

Figure 2 is a transverse sectional view taken on a plane represented by line 2—2 in Figure 1, and Figure 3 is a fragmental top plan view illustrating the feed end of the apparatus.

Referring to the drawing, by reference characters in which like characters designate like parts, 11 designates a brine tank for containing a brine at a temperature of about from 0° to 7° Fahrenheit, preferably from 5° to 7° Fahrenheit.

Extending longitudinally of tank 11 is a pair of tracks 12 and 13, one of which is disposed directly above and parallel with the other as indicated in Figure 1, and preferably the two tracks are in relatively close juxtaposition.

As indicated in Figure 1, the two tracks 12 and 13 dip into tank 11 in parallelism and extend from opposite ends thereof horizontally as indicated.

Each track, 12 and 13, as is more clearly indicated in Figure 2, is composed of a pair of laterally spaced channel rails 14, the channels of which face each other. The channels are of a width to loosely receive the ends of side bars 15 of molds 16 comprising bars 15 and open-ended tubes 17, having their opposite ends secured in bars 15 as in the above referred to copending applications. The ends of bars 15 rest in channels of rails 14 for sliding movement therein and the opposite flanges of rails 14 defining the channels confine the molds 16 against movement out of the plane of tracks 12 and 13.

Rails 14 of tracks 12 and 13 adjacent the loading end of tank 11 have the outer flanges thereof cut away as indicated at 18 (Figure 3) for facilitating the application of molds to tracks 12 and 13. The molds are applied to the tracks by simply tilting them slightly, so that the lower bar 15 may clear the upper track, and the molds then are lowered into contact with the lower flanges of the tracks. Movement of the molds along the track will carry the bars beneath the upper flanges of the tracks.

Each of the tracks 12 and 13 is adapted to convey a series of molds 16 in abutting relation, each filled with sausage meat, through tank 11 and the brine contained therein, and suitable means are provided for successively or intermittently moving the series of molds through the brine which comprises, in the preferred embodiment illustrated, a rectangular plate 19 slidably disposed between tracks 12 and 13 and provided with a pair of laterally spaced upwardly projecting pawls 21 pivotally supported within slots therein and a like pair of downwardly projecting pawls 22, the pawls 21 and 22 being free to swing out of the path of bars 15 upon movement of plate 19 in a direction away from tank 11 and being prevented from swinging in the opposite direction, whereby upon forward movement of plate 19, pawls 21 and 22 engage upper and lower bars 15 respectively of molds 16 and cause the molds to move along parallel upper and lower tracks 12 and 13, each newly inserted mold serving to move previously inserted molds forwardly. The molds are thus successively moved through the tank and successively discharged therefrom at the opposite end. As the molds are fed continuously to the track it follows that each mold will remain in the tank the same length of time. The length of the tank is proportioned so that the molds will preferably remain in the brine for about seven minutes.

The ends of plate 19 extend laterally beyond the sides of tracks 12 and 13 and are provided with supports 23 which at their inner ends carry guides 24 which are slidably supported on suitable extensions 25 of rails 14 of lower track 13. Rotatably journalled in suitable bearings 26 supported by tank 11 is a transversely extending shaft 27 to one end of which is fixed a drive pulley 28 adapted to receive a drive belt 29 from any suitable source of power. Fixed to shaft 27 adjacent the opposite ends thereof is a pair of disks 31, one for each side of tracks 12 and 13.

Disks 31, as indicated in Figure 1, are provided with radially spaced openings 32 for selectively receiving the adjacent ends of cranks 33 whose opposite ends are pivotally secured to adjacent ends of guides 24. Openings 32 are so arranged relative to the centers of disks 31 that by pivoting the adjacent ends of cranks 33 to different ones thereof the throw of cranks 33 will be varied so as to engage each succeeding mold 16, every other mold or every third mold, depending upon which projections cranks 33 are attached thereto.

By this selective arrangement the series of molds 16 may be carried through the brine in tank 11 at selected rates of speed in order to vary the time of engagement of the sausages with the brine.

In the operation of the apparatus disclosed by which my improved method is carried into effect, tank 11 is filled with brine to a depth whereby tracks 12 and 13 are submerged therein, the brine being at a temperature of preferably from 5° to 7° F., and the molds 16, which have been filled with sausage meat in accordance with my copending applications, 172,612 and 255,941, are successively loaded onto tracks 12 and 13 with the meat therein at ordinary temperature such as approximately 65° F. The shaft 27 is constantly rotated through pulley 28, which in turn causes constant rotation of disks 31 which through cranks 33 impart a reciprocating motion to plate 19 which in turn, through pawls 21 and 22, pivotally carried thereby imparts an intermittent movement to the series of molds 16 in tracks 12 and 13. Cranks 33 are connected to disks 31 so that the movement of molds 16 through tank 11 will be such that the sausages will be subjected to the action of the cold brine for a sufficient period to cause a proper solidification of the meat. Contrary to expectation, the brine does not penetrate into the interior of the sausage bodies by way of the open ends of the molds. Such a penetration would give the meat an excessive moisture content and salty flavor, and it might deposit undesirable substances within the sausages because of the previous contact of the brine with the parts of the apparatus. However, as a result of the low temperature employed and the rapidity of heat transfer, thin skin-like formations appear almost instantaneously on the exposed ends of the sausages to provide protective coatings which are effective seals against the entrance of any brine into the sausage bodies. The time required for any one mold within the brine is approximately seven minutes, as it has been found that with a brine at a temperature of from 5° to 7° F., the time required for proper treatment of the sausages in engagement with the brine is approximately seven minutes. The speed of molds 16 through the tank 11 can also be varied by changing the speed of rotation of pulley 28.

The molds successively move out of contact with the brine at the opposite end of tank 11, at which time the sausages are at a temperature of approximately 25° F. and are moved along tracks 12 and 13 in an atmosphere at a temperature of approximately 68° F. into proximity to the pushing-out of extracting machine as disclosed in copending application, 255,942.

If desired, to prevent the molds from freezing together in their passage through the brine small spacing pegs or projections (not shown) may be applied to the end bars of the molds in such manner as to maintain the ends of the molds spaced apart slightly.

The molds may then be permitted to remain subject to the temperature of the room for a period of time not exceeding five minutes in order to permit the temperature of the molds to rise sufficiently so that the molded sausages may be ejected from the mold cavities without requiring the application of the heavier powers necessitated to expel the sausage if the rewarming of the molds is omitted. Rewarming to such an extent as to materially soften the sausage in the molds should, however, be avoided as when the meat softens too much, the smooth nature of the surface is destroyed.

The molds are then introduced into the pushing-out or ejecting machine after a proper lapse of time after emerging from the brine in tank 11. The sausages may then be successfully extracted from the molds.

The apparatus just described is capable of being used for the purpose of cooking sausages in molds in accordance with the disclosure in Patent No. 1,009,953 dated November 28, 1911. When put to this use the tank is filled with water maintained at a relatively high temperature, and the rate of feed of the molds through the tank is adjusted so that the proper amount of time will elapse to complete the cooking operation while the molds are passing from one end of the tank to the opposite end thereof.

From the foregoing disclosure, it will be apparent that a novel method and apparatus is provided for the treatment of sausages in molds prior to the extraction thereof whereby such extraction is facilitated and whereby the sausages emerge from the molds in a desired condition, thus rendering them to be desired by prospective purchasers.

Having set forth a preferred embodiment only of my invention, what is desired to be secured by Letters Patent and claimed as new is:—

1. A method of treating sausages in molds to facilitate extraction thereof from the molds without injury to the sausages comprising suddenly chilling the sausages in the molds below a freezing temperature by passing the molds over a definite path at a predetermined rate of movement through a medium maintained at a very low temperature; and subsequently causing the temperature of the molds to rise by subjecting the same to ordinary room temperature.

2. A method of treating sausages in molds for effective extraction thereof without injury thereto comprising the step of continuously subjecting the molds to the action of a brine maintained at a temperature of approximately 5° F. for a predetermined short period of time; and the further step of then causing the temperature of the molds to rise to a small degree by subjecting the same to ordinary room temperature for a short period of time.

3. A method of treating sausages in molds for uninjured extraction therefrom comprising continuously moving the molds through a cold medium maintained at approximately 5° F.; and thereafter subjecting the molds to a room temperature for a predetermined short interval of time.

4. A method of treating sausages in molds so that they may be extracted therefrom without injury to the molded surfaces comprising continuously propelling the molds through a definite path in a cold brine, and then subjecting the molds to ordinary room temperature.

5. A method of treating sausages in molds to effect removal of the sausages from the molds without injury thereto comprising the steps of chilling the sausages to approximately 25° F. and thereafter warming the surfaces of the sausages to a comparatively slight degree by exposure to normal room temperature for a few minutes of time.

6. A method of treating sausages in molds comprising the step of chilling the sausages by immersion for a period of several minutes in a liquid refrigerant at a temperature approximately within the range of 0° to 7° F.

7. A method of treating a sausage in a mold comprising the steps of immersing the mold and sausage in a cold liquid refrigerant, moving said mold and sausage through a definite path at a predetermined rate of movement to cause the body of the sausage to set and have formed thereon a smooth outer coating and thereafter subjecting the outer surface of the sausage to a relatively high temperature compared to the temperature of the refrigerant.

8. A method of treating sausages in open-ended molds, comprising the steps of immersing them in a brine at a temperature within the approximate range of 0° to 7° F. for a period sufficient to cause the bodies of the sausages to set and have smooth outer coatings formed thereon, removing them from the brine and immediately, prior to extraction of the sausages from the molds, subjecting the outer surface portions of the sausages to a relatively high temperature compared to the temperature of said brine.

9. A method for treating sausages in molds to cause the sausages to assume a set form, comprising the steps of successively placing a plurality of fixed quantities of sausage meat in a set of separate and independent molds, conveying the set of molds through a definite path in a liquid bath while maintaining said bath at a temperature substantially below 32° F. until the sausage surfaces are set by chilling, then removing said molds from said bath into an atmosphere at approximately normal room temperature for a period of less than five minutes, and thereafter successively extracting the sausages in set form from said independent molds.

CHARLES H. VOGT.